US012709189B2

(12) United States Patent
Xu et al.

(10) Patent No.: US 12,709,189 B2
(45) Date of Patent: Aug. 18, 2026

(54) HEATING AND COOLING FOR A PARALLEL CONNECTED MIXED CHEMISTRY BATTERY PACK

(71) Applicant: GM Global Technology Operations LLC, Detroit, MI (US)

(72) Inventors: Shuonan Xu, Troy, MI (US); Jun-mo Kang, Ann Arbor, MI (US); Madhusudan Raghavan, West Bloomfield, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 334 days.

(21) Appl. No.: 18/358,398

(22) Filed: Jul. 25, 2023

(65) Prior Publication Data

US 2025/0033527 A1 Jan. 30, 2025

(51) Int. Cl.

| | |
|---|---|
| ***B60L 58/24*** | (2019.01) |
| ***B60L 50/64*** | (2019.01) |
| ***B60L 58/18*** | (2019.01) |
| ***H01M 10/42*** | (2006.01) |
| ***H01M 10/613*** | (2014.01) |
| ***H01M 10/625*** | (2014.01) |

(Continued)

(52) U.S. Cl.

CPC ............... *B60L 58/24* (2019.02); *B60L 50/64* (2019.02); *B60L 58/18* (2019.02); *H01M 10/425* (2013.01); *H01M 10/613* (2015.04); *H01M 10/625* (2015.04); *H01M 10/63* (2015.04); *H01M 10/6561* (2015.04); *H01M 10/658* (2015.04); *B60L 2210/10* (2013.01); *H01M 2220/20* (2013.01)

(58) Field of Classification Search

CPC .. H01M 10/613; H01M 10/625; H01M 10/63; H01M 10/6561; H01M 10/658; B60L 58/28; B60L 58/64; B60L 58/16; B60L 50/64

USPC ........................................................ 180/65.1

See application file for complete search history.

(56) References Cited

U.S. PATENT DOCUMENTS

| | | | | |
|---|---|---|---|---|
| 9,452,659 | B2 * | 9/2016 | Styles | B60H 1/00278 |
| 11,440,392 | B2 * | 9/2022 | Grace | H01M 10/6568 |

(Continued)

FOREIGN PATENT DOCUMENTS

| | | |
|---|---|---|
| CN | 116231167 A | 6/2023 |
| DE | 102023002016 A1 | 11/2024 |

OTHER PUBLICATIONS

German Office Action for German Application No. 102023128155.0; dated Apr. 25, 2025; 5 pages.

*Primary Examiner* — Hau V Phan

(74) *Attorney, Agent, or Firm* — CANTOR COLBURN LLP

(57) ABSTRACT

A method for operating a vehicle includes drawing operational power from a first set of battery cells and providing heating/cooling to the first set of battery cells and not to a second set of battery cells to maintain the first set of battery cells within an operational temperature window in a first mode of operation. The method switches to a second mode of operation in response to a power assist request, and draws operational power from the first set of battery cells and a second set of battery cells and provides heating/cooling to maintain the first set of battery cells and the second set of battery cells within the operational temperature window during the second mode of operation.

20 Claims, 3 Drawing Sheets

(51) Int. Cl.
*H01M 10/63* (2014.01)
*H01M 10/6561* (2014.01)
*H01M 10/658* (2014.01)

(56) References Cited

U.S. PATENT DOCUMENTS

| | | | | |
|---|---|---|---|---|
| 2010/0305792 | A1* | 12/2010 | Wilk | B60L 50/61 701/22 |
| 2012/0040212 | A1* | 2/2012 | Hermann | B60L 1/02 429/50 |
| 2014/0038009 | A1 | 2/2014 | Okawa et al. | |
| 2015/0037647 | A1* | 2/2015 | Nguyen | H01M 10/6555 429/120 |
| 2018/0123192 | A1* | 5/2018 | Fees | H01M 50/24 |
| 2021/0376395 | A1* | 12/2021 | Hermann | H01M 10/486 |
| 2022/0105793 | A1* | 4/2022 | Sukhatankar | B60W 30/19 |
| 2022/0169125 | A1* | 6/2022 | Borghi | B60L 3/0046 |
| 2022/0281353 | A1* | 9/2022 | Cheadle | H01M 10/615 |

* cited by examiner

HEATING AND COOLING FOR A PARALLEL CONNECTED MIXED CHEMISTRY BATTERY PACK

INTRODUCTION

The subject disclosure relates to heating and cooling systems for parallel configured battery packs including battery cells having multiple distinct chemistries.

Vehicles, including electric and hybrid electric vehicles, feature battery storage systems for purposes such as powering electric motors, electronics and other vehicle subsystems. Batteries for the battery storage system typically include multiple distinct battery cells, each of which stores energy and is highly capable of delivering power, and the battery cells are electrically connected to provide an output power. Operating the battery cells at temperatures that are outside of a specific temperature range, referred to as the operating window, can result in decreased lifespan and decreased charge capacity of the battery cells.

Further, in some examples, some of the battery cells may not be utilized for initial operation, or for short duration trips, and as such heating or cooling all of the battery cells results in an unnecessary expenditure of power.

Accordingly, it is desirable to provide a flexible battery heating and cooling system.

SUMMARY

In one exemplary embodiment an energy storage system for a vehicle includes a battery system having a first set of battery cells and a second set of battery cells electrically parallel to the first set of battery cells, a coolant loop having a first portion passing through the first set of battery cells, a second portion passing through the second set of battery cells, and a flow control device, and a controller configured to cause the flow control device to limit coolant to the first portion in a first mode of operation and configured to cause the flow control device to allow coolant to pass through the first portion and the second portion in a second mode of operation.

In addition to one or more of the features described herein the coolant loop further comprises a third mode in which the flow control device is configured to allow coolant to pass through the second portion and not the first portion.

In addition to one or more of the features described herein the first set of battery cells is a first cell type and the second set of battery cells is a second cell type distinct from the first cell type.

In addition to one or more of the features described herein the first set of cells is connected to a power distribution bus, and the second set of battery cells is connected to the first set of battery cells via a direct current (DC)-DC converter.

In addition to one or more of the features described herein the DC-DC converter is actively controlled via the controller, and wherein the controller includes a memory storing instructions for operating the DC-DC converter in an AC heater mode.

In addition to one or more of the features described herein the memory stores instructions for causing the controller to control the DC-DC converter in the AC heater mode and heat the first set of battery cells, and to simultaneously cause the flow control device to direct the coolant through the second portion and not the first portion.

In addition to one or more of the features described herein a thermal barrier is positioned between the first set of battery cells and the second set of battery cells.

In addition to one or more of the features described herein the first set of battery cells have a faster charge rate and a lower power density than the second set of battery cells and wherein the first mode of operation is a mode in which power is drawn exclusively from the first set of battery cells.

In addition to one or more of the features described herein the second mode of operation is a mode in which power is drawn from the first set of battery cells and the second set of battery cells.

In another exemplary embodiment a method for operating a vehicle includes drawing operational power from a first set of battery cells and providing heating/cooling to the first set of battery cells with the heating/cooling being limited to the first set of battery cells to maintain the first set of battery cells within an operational temperature window in a first mode of operation; switching to a second mode of operation in response to a power assist request, and drawing operational power from the first set of battery cells and a second set of battery cells and providing heating/cooling to maintain the first set of battery cells and the second set of battery cells within the operational temperature window during the second mode of operation.

In addition to one or more of the features described herein switching to the second mode of operation includes altering a mode of a flow control device such that a coolant is directed to both a first coolant sub loop passing through the first set of battery cells and a second coolant sub loop passing through the second set of battery cells.

In addition to one or more of the features described herein the coolant is evenly split between the first coolant sub loop and the second coolant sub loop.

In addition to one or more of the features described herein the coolant is unevenly split between the first coolant sub loop and the second coolant sub loop.

In addition to one or more of the features described herein, some examples include switching to a third mode of operation, wherein the third mode of operation includes operating a direct current (DC)-DC converter connecting the first set of battery cells to the second set of battery cells as an alternating current (AC) heater.

In addition to one or more of the features described herein the third mode of operation further includes heating one of the first set of battery cells and the second set of battery cells using the DC-DC converter operating as the AC heater and cooling the other of the first set of battery cells and the second set of battery cells by directing coolant through a corresponding coolant sub loop using a flow control device.

In addition to one or more of the features described herein the first set of battery cells and the second set of battery cells are thermally isolated via a thermal barrier.

In yet another exemplary embodiment a vehicle including a propulsion system having at least one electric motor connected to a power distribution bus, an energy storage system comprising a first set of battery cells connected to the power distribution bus, a second set of battery cells connected to the first set of battery cells via a direct current (DC)-DC converter, the energy storage system further comprising a coolant system having a coolant loop, the coolant loop including a first coolant sub loop passing through the first set of battery cells and a second coolant sub loop passing through the second set of battery cells, and a controller configured to cause the at least one electric motor to draw operational power from the first set of battery cells and the power storage system to provide heating/cooling to the first set of battery cells and not to the second set of battery cells to maintain the first set of battery cells within an operational temperature window in a first mode of operation, switching to a second mode of operation in response to a power assist request, and draw operational power from the first set of battery cells and a second set of battery cells and provide heating/cooling to maintain the first set of battery cells and the second set of battery cells within the operational temperature window during the second mode of operation.

In addition to one or more of the features described herein the controller is further configured to cooperate a direct current (DC)-DC converter connecting the first set of battery cells to the second set of battery cells as an alternating current (AC) heater in a third mode of operations.

In addition to one or more of the features described herein the controller is configured to cause the DC-DC converter to heat one of the first set of battery cells and the second set of battery cells by operating as the AC heater and cool the other of the first set of battery cells and the second set of battery cells by directing coolant through a corresponding coolant sub loop using a flow control device.

In addition to one or more of the features described herein switching to the second mode of operation includes causing a mode of a flow control device to be altered such that a coolant is directed to both a first coolant sub loop passing through the first set of battery cells and a second coolant sub loop passing through the second set of battery cells.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
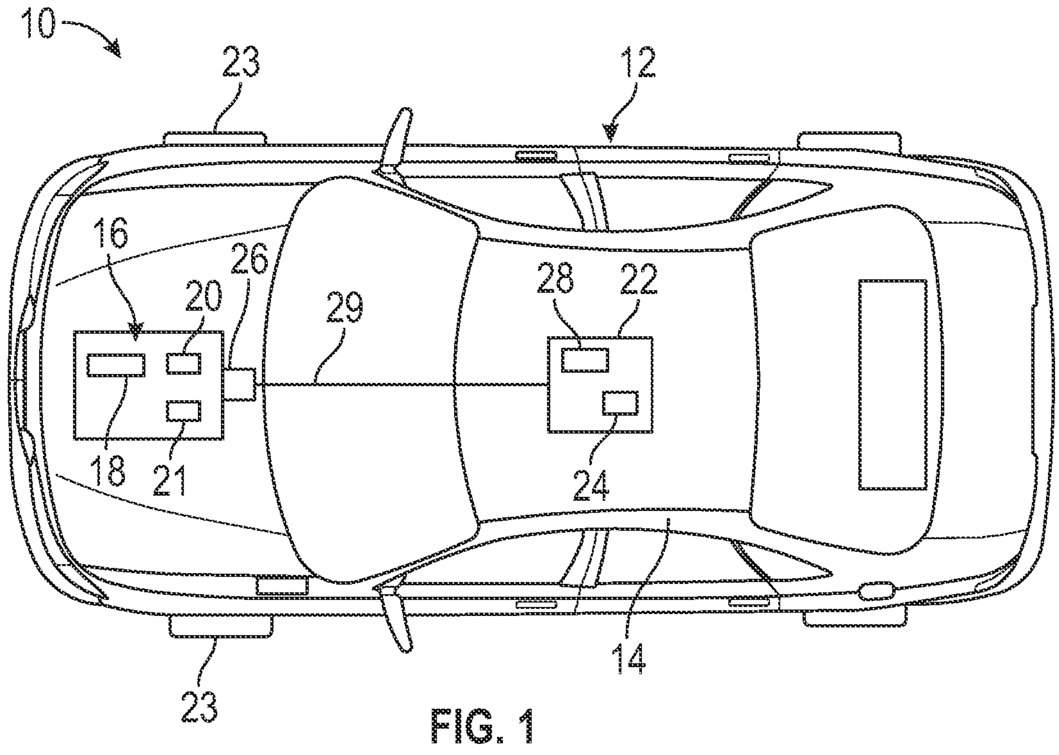
FIG. 1 is a vehicle including a battery based energy storage system.

The following description is merely exemplary in nature and is not intended to limit the present disclosure, its application or uses. It should be understood that throughout the drawings, corresponding reference numerals indicate like or corresponding parts and features.

As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

As used herein the term coolant refers to a material, typically a fluid or gas, with the material being configured to alter a temperature of an adjacent object based on a difference between the temperature of the object and the temperature of the coolant. The term coolant does not imply or mandate a cooling operation, and can be used in a cooling system, a heating system, and/or a combination cooling and heating system.

In accordance with an exemplary embodiment, a vehicle energy storage system includes a battery pack having a first set of battery cells and a second set of battery cells, with the battery cells being arranged in parallel. The first set of battery cells and the second set of battery cells are constructed of distinct power cell chemistries with the first power cell type being fast charging and low energy storage density battery cells and the second power cell type being slow charging and high energy density. A heating and cooling loop is included within the battery pack. The heating and cooling loop is configured to independently cool and/or heat the first set of battery cells without cooling or heating the second set of battery cells in one mode and is configured to simultaneously cool or heat both sets of battery cells in a second mode.

With continued reference to the general system described above, FIG. 1 shows an embodiment of a motor vehicle 10 including a battery system controller 24 configured to control a battery system. The vehicle 10 includes a vehicle body 12 defining, at least in part, an occupant compartment 14. The vehicle body 12 also supports various vehicle subsystems including a propulsion system 16, a battery system 22, other subsystems to support functions of the propulsion system 16 and other vehicle components, such as a braking subsystem, a suspension system, a steering subsystem, a fuel injection subsystem, an exhaust subsystem and others.

The vehicle 10 may be a combustion engine vehicle, an electrically powered vehicle (EV) or a hybrid vehicle. In an embodiment, the vehicle 10 is a hybrid vehicle that includes a combustion engine system 18 and at least one electric motor assembly. For example, the propulsion system 16 includes a first electric motor 20 and a second electric motor 21. The motors 20 and 21 may be configured to drive wheels 23 on opposing sides of the vehicle 10. Any number of motors positioned at various additional locations about the vehicle 10 may be used to provide mechanical rotation to corresponding systems and subsystems.

The battery system 22 may be electrically connected to the motors 20 and 21 and/or other components, such as vehicle electronics. The battery system 22 may be configured as a rechargeable energy storage system (RESS), and includes multiple battery cells partitioned into portions. A battery system controller 24 is included within the battery system 22 and controls the charging and discharging functions of the batteries within the battery system 22. In alternative configurations, the battery system controller 24 can be a general vehicle controller remote from the battery system 22 and configured to control multiple systems and/or subsystems. The general vehicle controller can be located at any position within the vehicle 10. In yet further alternatives, the battery system controller 24 can be a distributed control system including multiple coordinating controllers throughout the vehicle 10 encompassing controllers within the battery system 22 and controllers remote from the battery system 22.

In one embodiment, the battery system 22 includes one or more battery packs 28. The battery packs 28 include multiple distinct battery cells arranged in parallel and connected to a power distribution bus 29 for providing power to one or more systems. In the exemplary system of FIG. 1, the power distribution bus 29 is illustrated in simplified form and provides power to the propulsion systems 16 through an inverter 26.

Figure 2A:
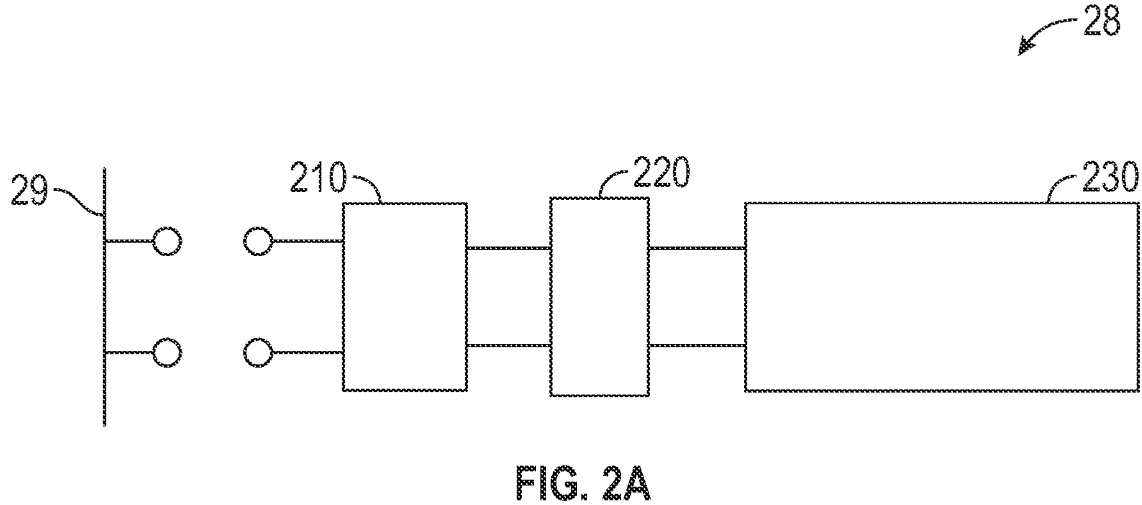
FIG. 2A is an exemplary battery pack according to one embodiment.
Figure 2B:
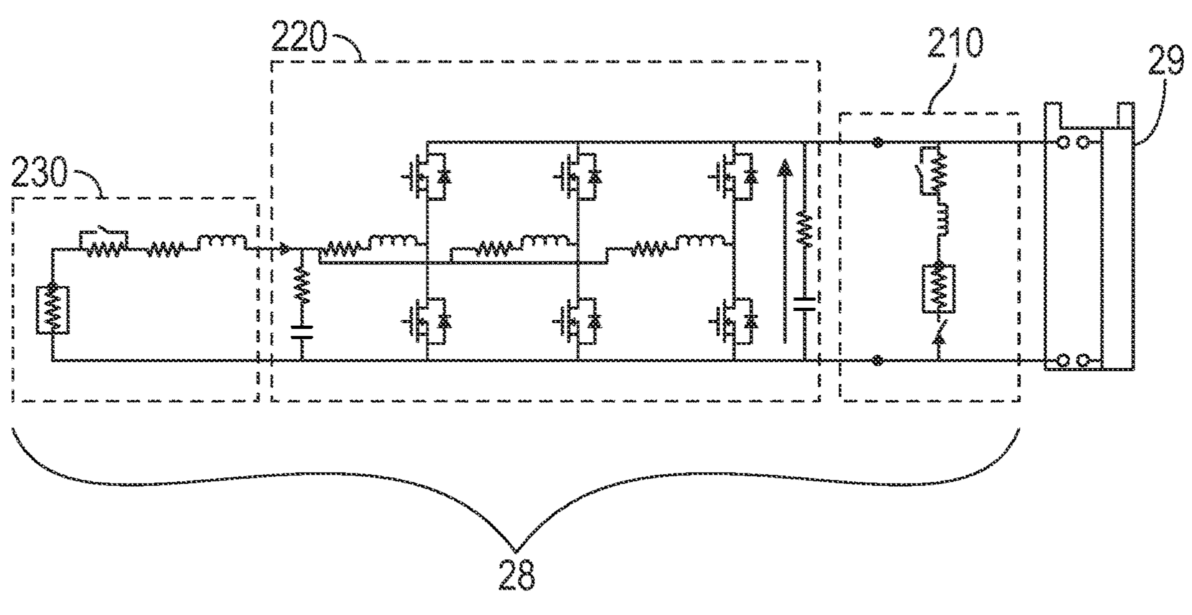
FIG. 2B is a circuit diagram of the exemplary battery pack of FIG. 2A.

With continued reference to FIG. 1, FIG. 2A schematically illustrates a single battery pack 28 and FIG. 2B illustrates one example circuit diagram for implementing the schematic battery pack 28 of FIG. 2A. The illustrated battery pack 28 includes a first power cell 210 and a second power cell 230 connected to the first power cell 210, in parallel, via a direct current (DC)-DC converter 220. While illustrated as a single power cell each for ease of illustration, it is appreciated that each power cell 210, 230 is implemented in practice via multiple battery cells of the same type arranged in an array according to known principles and practices without altering the schematic arrangements of FIGS. 2A and 2B, and without altering the operations described herein. As such, the first battery cell 210 and second battery cell 230 are alternatively referred to as sets of battery cells.

The first set of battery cells 210 and the second set of battery cells 230 are constructed of distinct chemistries (e.g., NCM based battery cells, LFP based battery cells, Na-ion based battery cells, Si-anode based battery cells, etc.), and as a result, the first set of battery cells 210 and the second set of battery cells 230 have different power characteristics. In general, the first set of battery cells 210 has a lower energy density and a faster charge rate, relative to the second set of battery cells 230. The use of mixed chemistries allows a designer to balance conflicting needs of fast charging that can be achieved using the low energy density faster charge rate battery cells and the need of high energy density power storage for longer range applications. The different combined chemistry types are referred to generally herein as a mixed configuration battery pack.

In the parallel connection illustrated in FIGS. 2A and 2B, the sets of battery cells 210, 230 are connected to each other via a bi-directional direct current (DC)-DC buck or boost converter 220. In this arrangement, the voltage of one set of battery cells 210, 230 is always maintained higher or lower than the voltage of the other set of battery cells 210, 230. In the illustrated example of FIGS. 2A and 2B, the power cell(s) in the voltage of the higher power density, slower charge speed battery cells (second set of battery cells 230) in the second set of battery cells 230 are maintained at a higher voltage level.

Battery cells, such as those used in both the first set of battery cells 210 and the second set of battery cells 230, exhibit a relatively steady voltage decline as a state of charge decreases until a drop off point, after which the voltage of the power cell sinks at a fast rate. The state of charge at which the drop off point is reached is dependent on the temperature of the power cell 210, 230, with a low temperature resulting in a drop off point at a substantially higher state of charge than when the power cell 210, 230 is warm. This is the result of cool temperatures increasing internal resistance of the sets of battery cells 210, 230. When both sets of battery cells 210, 230 are experiencing a low temperature, the output power of the battery pack 28 is typically limited in order to avoid violating the voltage constraint requiring the first set of battery cells 210 to have a lower voltage than the second set of battery cells 230.

One drawback to mixed configuration battery packs, such as battery pack 28 is that hot and cold ambient temperatures can accelerate degradation of the sets of battery cells 210, 230 and operating battery cells 210, 230 outside of a temperature window (e.g., when the battery cells are either too hot or too cold) contributes to the degradation. In addition, a low temperature can cause a premature reliance on the high power density battery cells (the second set of battery cells 230) instead of the faster charging low power density battery cells (the first set of battery cells 210).

In order to mitigate this drawback, the battery pack 28 includes a heating/cooling system configured to heat or cool the sets of battery cells 210, 230 in the battery pack 28, thereby ensuring that the battery pack 28 remains within a desired operating temperature window. The cooling loop is configured to independently heat/cool the low power density battery cells in the first set of battery cells 210 in some modes and is configured to simultaneously heat/cool the first set of battery cells 210 and the slower charging high power density battery cells (the second set of battery cells 230) in another configuration.

During operation, the low power density fast charging power cell(s) 210 are used to provide energy to the propulsion system 16 and are referred to as propulsion battery cells. During the initial portions of vehicle operation, only energy from the propulsion battery cells 210 is provided to the propulsion system 16. Energy from the second set of battery cells 230 having a higher power density, but a slower charge rate is utilized only after there is a power assist request due to the first set of battery cells 210 approaching a low state of charge.

As only the first set of battery cells 210 is used for the initial phases of operation, or for the entire operation in the case of a short route, simultaneously heating or cooling both the first set of battery cells 210, and the second set of battery cells 230 to be within the operating window is unnecessary and increases the time required for the battery cells 210 in the first set of battery cells 210 to reach optimum operating temperatures.

Figure 3A:
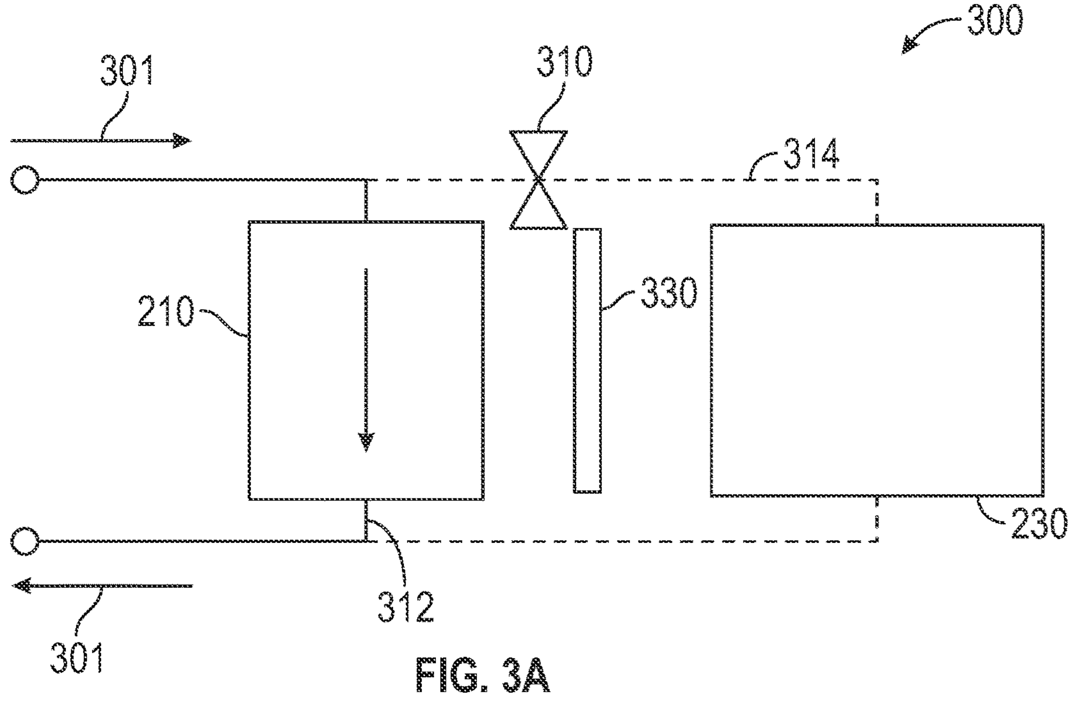
FIG. 3A is an exemplary coolant schematic for a heating/cooling system of a battery pack according to an exemplary embodiment in a first mode of operations.
Figure 3B:
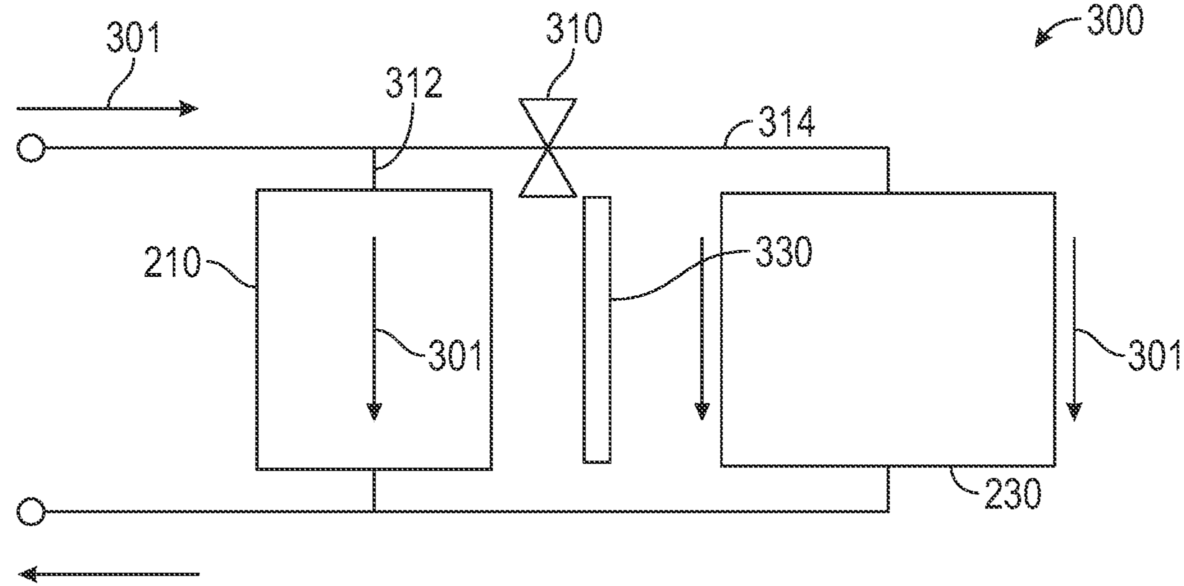
FIG. 3B is an exemplary coolant schematic for a heating/cooling system of a battery pack according to an exemplary embodiment in a second mode of operations.

FIGS. 3A and 3B illustrate a cooling system 300 that can direct all heating/cooling power to the first set of battery cells 210 for the initial portions of vehicle operation and can switch to a balanced heating/cooling power between both sets of battery cells 210, 230 once a power assist request has been made (i.e., once the power from the first set of battery cells 210 alone is insufficient to maintain operations). The switch is made using a valve 310, or other flow control device, positioned at an upstream end of a portion 314 of the cooling system 300 passing through the second set of battery cells 230.

FIG. 3A illustrates an example where the valve 310 is closed (e.g. at a beginning of the vehicle operation), and all coolant 301 is directed through a portion 312 of the cooling system 300 passing through the first set of battery cells 210, and then being returned to a beginning of the coolant system. FIG. 3B illustrates the same cooling system 300, with the valve 310 being opened, and coolant 301 being allowed to pass through both the first set of battery cells 210 and the second set of battery cells 230 simultaneously. In the example of FIG. 3A, 100% of the heating/cooling power is directed to the first set of battery cells 210, ensuring a fast temperature change of the first set of battery cells 210 without wasting any heating/cooling power. In the example of FIG. 3B, both sets of battery cells 210, 230 are utilized and the heating/cooling power is split between the sets of battery cells 210, 230.

In some examples, the valve 310 can be metered to allow both portions 312, 314 to receive coolant 301, while at the same time providing a different flowrate of coolant 301 to each portion 312, 314, thereby allowing one portion 312, 314 to receive more heating/cooling from the coolant passing through than the other portion 312, 314. In this example, the heating/cooling power is split unevenly, and the portion 312, 314 with the higher flowrate receives more heating/cooling power resulting in a faster temperature change.

In yet further examples, the valve 310 can be configured to remove coolant flow entirely from the first portion 312 allowing coolant flow through the second portion 314. Examples with this configuration may be utilized when the first portion 312 is within a desired temperature window and the second portion 314 is exiting or out of the desired temperature window and/or when another source of heating/cooling is available to control a temperature of the first portion 312.

The ability to provide cooling/heating to one portion 312, 314 without providing cooling/heating to the other portion 312/314 and to provide different magnitudes of cooling/heating to the portions 312, 314 is referred to herein as independently heating/cooling the portions 312, 314, and the multiple portion 312, 314 configuration can be referred to as a dual loop or a multi-loop.

In some examples, a thermal barrier 330 exists between the battery cells 210, 230. The thermal barrier 330 can be a physical barrier having a low thermal transfer rate, an air gap, or any physical configuration that prevents thermal transfer from the first set of battery cells 210 to the second set of battery cells 230, or vice versa. Alternatively, the thermal barrier can be achieved by physically disposing the first set of battery cells 210 and the second set of battery cells 230 in distinct locations within the vehicle 10. Regardless of the form the thermal barrier 330 takes, a fundamental feature of the thermal barrier 330 is that temperatures from each of the sets of battery cells 210, 230 are prevented from affecting the temperature of the other of the sets of battery cells 210, 230.

In yet further examples, the DC-DC converter 220 (illustrated in FIGS. 2A and 2B) can be physically disposed adjacent one of the sets of battery cells 210, 230 and can include an electric heater operation mode. In electric heater mode, the DC-DC converter 220 is operated in a manner that converts electrical energy to "waste heat" without passing the electrical energy to another component. The electric heater operations can be accomplished using a controller switching the DC-DC converter 220 according to any known electric heater mode. In such a case, the coolant can be provided to one of the sets of battery cells 210, 230 and the DC-DC converter 220 can provide direct heating to the other of the sets of battery cells 210, 230, thereby allowing for one set of battery cells 210, 230 to be heated while the other set of battery cells 210, 230 is cooled.

Referring collectively to the figures, one example use case of the dual loop heating/cooling system disclosed herein provides a fast heating/cooling of the first set of battery cells 210. In the first use case, the first set of battery cells 210 to provide power to the propulsion system 16, and initially all heating/cooling power is directed to the portion 312 passing through the first set of battery cells 210. This heating/cooling power distribution is maintained until the power demand from the propulsion system exceeds the maximum power output of the first set of battery cells 210, and a power assist from the second set of battery cells 230 is required. At this time, heating/cooling power is split between the two sets of battery cells 210, 230 and power is drawn from both sets of battery cells.

Another example use case of the dual loop heating/cooling system 300 disclosed herein provides heating/cooling to the second set of battery cells 230 on vehicle initialization, when the first set of battery cells is already within the target temperature window.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

Unless specified to the contrary within, schematic representations do not correspond one to one with physical structures, and the relative positioning, size, orientation, or other configurations of the components within the schematic representation are not limiting.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An energy storage system for a vehicle comprising:

a battery system having a first set of battery cells and a second set of battery cells electrically parallel to the first set of battery cells;

a coolant loop having a first portion passing through the first set of battery cells, a second portion passing through the second set of battery cells, and a flow control device; and a controller configured to cause the flow control device to limit coolant to the first portion in a first mode of operation and configured to cause the flow control device to allow coolant to pass through the first portion and the second portion in a second mode of operation, and a third mode in which the flow control device is configured to allow coolant to pass through the second portion and not the first portion.

2. The energy storage system of claim 1, wherein the first set of battery cells is a first cell type and the second set of battery cells is a second cell type distinct from the first cell type.

3. The energy storage system of claim 1, wherein the first set of cells is connected to a power distribution bus, and the second set of battery cells is connected to the first set of battery cells via a direct current (DC)-DC converter.

4. The energy storage system of claim 3, wherein the DC-DC converter is actively controlled via the controller, and wherein the controller includes a memory storing instructions for operating the DC-DC converter in an AC heater mode.

5. The energy storage system of claim 4, wherein the memory stores instructions for causing the controller to control the DC-DC converter in the AC heater mode and heat the first set of battery cells, and to simultaneously cause the flow control device to direct the coolant through the second portion and not the first portion.

6. The energy storage system of claim 1, further comprising a thermal barrier positioned between the first set of battery cells and the second set of battery cells.

7. The energy storage system of claim 6, wherein the thermal barrier is an air gap.

8. The energy storage system of claim 1, wherein the first set of battery cells have a faster charge rate and a lower power density than the second set of battery cells and wherein the first mode of operation is a mode in which power is drawn exclusively from the first set of battery cells.

9. The energy storage system of claim 8, wherein the second mode of operation is a mode in which power is drawn from the first set of battery cells and the second set of battery cells.

10. A method for operating a vehicle comprising:

drawing operational power from a first set of battery cells and providing heating/cooling, with the heating/cooling being limited to the first set of battery cells to maintain the first set of battery cells within an operational temperature window in a first mode of operation;

switching to a second mode of operation in response to a power assist request; and drawing operational power from the first set of battery cells and a second set of battery cells and providing heating/cooling to maintain the first set of battery cells and the second set of battery cells within the operational temperature window during the second mode of operation; and wherein the first set of battery cells and the second set of battery cells are components of an energy storage system for the vehicle, wherein the energy storge system includes:

the first set of battery cells and the second set of battery cells electrically parallel to the first set of battery cells;

a coolant loop having a first portion passing through the first set of battery cells, a second portion passing through the second set of battery cells, and a flow control device; and a controller configured to cause the flow control device to limit coolant to the first portion in a first mode of operation and configured to cause the flow control device to allow coolant to pass through the first portion and the second portion in a second mode of operation, and a third mode in which the flow control device is configured to allow coolant to pass through the second portion and not the first portion.

11. The method of claim 10, wherein switching to the second mode of operation includes altering a mode of a flow control device such that a coolant is directed to both a first coolant sub loop passing through the first set of battery cells and a second coolant sub loop passing through the second set of battery cells.

12. The method of claim 11, wherein the coolant is evenly split between the first coolant sub loop and the second coolant sub loop.

13. The method of claim 11, wherein the coolant is unevenly split between the first coolant sub loop and the second coolant sub loop.

14. The method of claim 10, further comprising switching to a third mode of operation, wherein the third mode of operation includes operating a direct current (DC)-DC converter connecting the first set of battery cells to the second set of battery cells as an alternating current (AC) heater.

15. The method of claim 14, wherein the third mode of operation further includes heating one of the first set of battery cells and the second set of battery cells using the DC-DC converter operating as the AC heater and cooling the other of the first set of battery cells and the second set of battery cells by directing coolant through a corresponding coolant sub loop using a flow control device.

16. The method of claim 10, wherein the first set of battery cells and the second set of battery cells are thermally isolated via a thermal barrier.

17. A vehicle comprising:

a propulsion system having at least one electric motor connected to a power distribution bus;

an energy storage system comprising:

a first set of battery cells and a second set of battery cells electrically parallel to the first set of battery cells;

a coolant loop having a first portion passing through the first set of battery cells, a second portion passing through the second set of battery cells, and a flow control device; and a controller configured to cause the flow control device to limit coolant to the first portion in a first mode of operation and configured to cause the flow control device to allow coolant to pass through the first portion and the second portion in a second mode of operation, and a third mode in which the flow control device is configured to allow coolant to pass through the second portion and not the first portion, wherein the first set of battery cells is connected to the power distribution bus, the second set of battery cells is connected to the first set of battery cells via a direct current (DC)-DC converter; and a controller is configured to cause the at least one electric motor to draw operational power from the first set of battery cells and the energy storage system to provide heating/cooling to the first set of battery cells and not to the second set of battery cells to maintain the first set of battery cells within an operational temperature window in the first mode of operation, switching to the second mode of operation in response to a power assist request, and draw operational power from the first set of battery cells and a second set of battery cells and provide heating/cooling to maintain the first set of battery cells and the second set of battery cells within the operational temperature window during the second mode of operation.

18. The vehicle of claim 17, wherein the controller is further configured to cooperate a direct current (DC)-DC converter connecting the first set of battery cells to the second set of battery cells as an alternating current (AC) heater in a third mode of operations.

19. The vehicle of claim 18, wherein the controller is configured to cause the DC-DC converter to heat one of the first set of battery cells and the second set of battery cells by operating as the AC heater and cool the other of the first set of battery cells and the second set of battery cells by directing coolant through a corresponding coolant sub loop using a flow control device.

20. The vehicle of claim 18, wherein switching to the second mode of operation includes causing a mode of a flow control device to be altered such that a coolant is directed to both a first coolant sub loop passing through the first set of battery cells and a second coolant sub loop passing through the second set of battery cells.

* * * * *